United States Patent Office 3,239,418
Patented Mar. 8, 1966

3,239,418
PITUITARY GROWTH HORMONE PROMOTER
AND METHOD OF USING SAME
Preston Perlman, Essex Fells, N.J., assignor to Schering Corporation, Bloomfield, N.J., a corporation of New Jersey
No Drawing. Filed Nov. 6, 1962, Ser. No. 235,863
5 Claims. (Cl. 167—74)

This invention relates to a pituitary gland stimulating substance and a method for preparing the same.

This application is a continuation-in-part of my application Serial No. 93,844, filed March 7, 1961, now abandoned.

The invention has particular reference to an active growth hormone promoter isolated from the hypothalamus and the posterior lobe of the pituitary gland of stock mammals which has the property of stimulating the release of somatotropic hormone from the anterior lobe of the pituitary gland.

The discovery which comprises the present invention is that the hypothalamus produces a substance capable of being extracted therefrom which plays an important role in the mechanism of mammalian growth. This novel substance which will be herein referred to as "pituitary growth hormone promoter" appears to be peptide like in chemical structure and exhibits the infra red absorption spectral characteristics more particularly set forth below.

The importance of the present finding is more fully appreciated when one considers the present status of known substances capable of stimulating growth in mammals. For example anterior pituitary extract long known to stimulate growth in mammals is inherently limited by the biological principle of species specificity. On the other hand certain naturally occurring and synthetic steroid type hormones have been prepared which when injected into a mammal will promote growth. An example of a naturally occurring steroid of this type is testosterone. However, these latter growth promoters, while free from species limitation do exert strong sex hormone activity which rules out their use in those cases where such is to be avoided.

It is the object of the present invention therefore, to provide a substance which has the property of promoting the rate of growth in mammals without exhibiting collateral activity, or administrative limitation.

The function of the novel substance is believed to be to exert an influence on the anterior pituitary of the selected mammal to cause it to increase its growth hormone release activity. Although the precise mechanism of this influence is not entirely understood, it is observed that when the substance of the invention is intravenously administered to a mammal under conditions whereby the anterior pituitary has been removed by surgery, a dose of the substance will not replace the action of the excised anterior pituitary. In contrast, where the anterior lobe is left intact and the extract of the invention is administered, for example parenterally, a substantial increase in growth will become evident in the mammal so treated.

The novel substance of this invention is produced by a series of process steps which, when considered as a unit designed to produce the particular substance for this invention, is quite novel.

The process of this invention is initiated by the extraction of the growth hormone promoter substance of this invention from either the hypothalamus or posterior pituitary tissue of suitable mammals, e.g., stock animals, into a dilute acidic aqueous solution. In practice it is preferred to treat an acetone-dried powder with a solution having about a 3.0 to 4.0 pH value. Preferably, a 0.25 to 0.5% acetic acid aqueous solution is utilized.

The acidic extract is then treated with either ammonium sulfate, alcohol or other suitable protein fractionating substance to obtain a precipitate containing the growth hormone promoter.

The growth hormone promoter may be further purified by redissolving the foregoing precipitate into a dilute aqueous acid solution followed by precipitating the growth hormone promoter with a petroleum ether ethyl ether mixture or other precipitating agent such as ammonium sulfate or a lower alkanol.

This second precipitate is rendered substantially free of other hormones such as vasopressin and oxytocin by selective elution from a packed weakly acidic cationic exchange column. This elution is made by an ammonium acetate buffer controlled to a basic eluting pH extending broadly from pH 7.1 to pH 9.5 having an acetate ion strength of from about 0.2 to 0.75 molar concentration. This gradient elution procedure is more particularly illustrated in the accompanying example. The most active moiety of our novel eluate is removed from the column at a point between pH 8.0 and 8.5 although aliquots which exhibit somewhat diminished activity are removed at pH values outside this specific range but within the broader range specified.

The general concept of the invention will be more particularly illustrated by the following example of preparation of the extract from the hypothalamus of a pig. The same general procedure would be followed in separation from the posterior lobe of the pituitary, or from the hypothalamus or posterior pituitary of other stock mammals.

EXAMPLE 1

Homogenize 143 grams of cold, finely ground porcine hypothalami in a conventional homogenizing apparatus such as a Waring blendor with 10 volumes of acetone having a temperature of about 2° C. for 3 minutes. Filter this homogenate through a suitable separatory vessel and wash the solid tan colored residue recovered twice with 5 volumes of acetone at the same temperature (2° C.) as above. Air dry the residue to remove the residual acetone and vacuum dry the same in the presence of phosphorus pentoxide to remove residual moisture. The yield is 26.7 grams of a dry tan colored powder.

To this tan powder add 1.6 liters of boiling 0.3% acetic acid solution with vigorous stirring for 3 minutes. Immediately filter this solution into an ice cooled vessel and wash the filter with 250 milliliters of boiling 0.3% acetic acid. Combine the filtrates obtained and evaporate to about 100 milliliters volume at 30° C. and under a reduced pressure of 0.1 millimeter of mercury. Lyophilize the concentrated solution. The yield is 2.7 grams of a dry powder.

Dissolve the dry powder from the preceding step in 212 milliliters of distilled water containing 0.9 milliliter of glacial acetic acid. Add to the solution formed 121 grams of ammonium sulfate in small portions of 3 to 5 grams each. Accompany by vigorous stirring at a temperature of 4° C. Separate off the light tan precipitate which forms at the bottom of the vessel and dry the same. 1.2 grams of a light tan powder is obtained.

Extract the light tan powder from the preceding step 3 times with 40 milliliters of glacial acetic acid added in equal quantities to dissolve most of the solid. Separate the undissolved residue from the solution by centrifugation at 2000 r.p.m. Add to the clear supernatant remaining 95 milliliters of ethyl ether and 191 milliliters of petroleum ether. Dissolve the precipitate which forms in a few milliliters of distilled water and lyophilize. Yield 24 milligrams of a dry substantially white powder. Take up this powder in 3 milliliters of 0.2M ammonium acetate buffer solution and pass the liquid sample downward through a packed, chromatographic column, preferably one 16 centimeters in length and 0.9 centimeter in diameter containing a cationic ion exchange resin (Amberlite CG-50 type II) which has been previously equilibrated with 0.2M ammonium acetate buffer (pH 6.8). After the sample has been introduced pass 40 milliliters of the 0.2M ammonium acetate buffer (pH 6.8) through the column.

Initiate the essential gradient elution step of the process by introducing into a constant volume mixing chamber containing 100 milliliters of 0.2M ammonium acetate buffer (pH 6.8) attached to the top of the column, 200 milliliters of 0.5M ammonium acetate buffer (pH 8.4) slowly to cause an equivalent quantity of liquid to pass out of the column at the bottom. Collect this in a plurality of 5 milliliter fractions or aliquots (approximately 40 of these aliquots are taken).

Change the gradient limit by adding 200 milliliters of 0.75M ammonium acetate (pH 9.5) into the constant volume mixing chamber slowly. Collect an equivalent quantity of 200 milliliters of effluent at the base of the column in a plurality of 5 milliliter aliquots approximately (40 of these are taken). At this point in the process 400 milliliters of effluent have been collected. The most active moiety is found in the aliquots which comprise the 60 milliliters taken off the column between 265 to 325 milliliters of the 400 milliliters of total effluent. Lyophilize this 60 milliliters of liquid to remove water, ammonia and ammonium acetate buffer. Yield 660 micrograms of a dry powder which constitutes the product of the example. This product is found to be water soluble, insoluble in alcohol and organic solvents, and slightly soluble in an alcohol-water mixture.

The substance prepared in the above manner appears to be a basic polypeptide of relatively low molecular size. It is strongly absorbed on weakly acidic cation exchange resins and can be eluted therefrom only under basic pH conditions. The basic character of the active moiety is further indicated by its electrophoretic mobility which is toward the cathode in buffer systems maintained at or near neutrality. The present evidence in support of a low molecular size is the fact that it will freely pass through a dialysis membrane of relatively fine pore size. The polypeptide nature of the substance is indicated by the fact that its activity is completely destroyed by the action of the specific enzymes animotripeptidase and carboxypeptidase. Complete destruction of physiological activity also results from hydrolysis of the substance by 6N hydrochloric acid for 24 hours.

Chromatographic analysis of the degradation product of said acid hydrolysis indicates the presence of 14 amino acids; namely, alanine, arginine, aspartic acid, glycine, glutamic acid, histidine, isoleucine, leucine, lysine, phenylanaline, proline, serine, threonine, and valine. Analysis of the product by infra-red spectrophotometry indicates the following absorptions which are set forth in Table I:

*Table I*

| Wavelength (millimicrons): | Functional group |
| --- | --- |
| 3.05 | OH and/or NH |
| 3.26 | Aromatic C—H |
| 3.40 | Aliphatic C—H |
| 6.05 | Carbonyl amide |
| 6.50 | Amide |
| 6.88 | Aliphatic bond vibration |

The major absorptions appearing in the 7.0 millimicron to 14.5 millimicron region of the spectrum appear at 7.15, 7.48, 8.05, 9.08, 9.88, 10.85, 12.30, 13.35 and 14.35 millimicrons.

Any suitable ion exchanger may be employed in the instant process as the adsorbing agent for the starting material which consists of the second precipitate which has been taken up in glacial acetic acid and taken through the ether precipitating step by way of further purification. The most suitable adsorbants in the present process are those selected from fibrous or granular substances or mixtures thereof having the requisite qualities that they will not decompose the isolated fraction passed through the column of such absorbants. Moreover, the adsorbant materials must not be soluble in the various solvents employed and in addition, not themselves decomposed by the solvent carrying the fraction or additionally soluble in the wash reagents or basic eluting liquid. A number of weakly acidic cationic exchange materials are known and our invention would embrace the use of many of these.

It is a feature of the invention that the utility of the above adsorbant will be greatly enhanced if, before use, it is washed with an ammonium acetate buffer having a pH of approximately 7. This treatment appears to condition the absorbant material for the subsequent attraction of the active moiety which is to be passed there through and adsorbed upon its surface.

As an example of increase in growth promoted by the product of the present invention the results of treatment of laboratory rats which were treated with it may be noted. In one experiment such rats injected daily for a period of 2 months at a total daily dose of 0.015 to 0.005 microgram exhibited gross body weight increases equal to 128 to 142% of saline injected control animals. On the other hand, when normal 150 gram rats are injected daily for a period of 5 days at a total daily dose of 0.015 microgram they demonstrated an increase in the width of the tibial epiphysis of from 50 to 80 micrometers greater than the growth at the epiphysis of saline treated control animals. This response is greater than that growth elicited by administration of a total dose of 2 milligrams of U.S.P. anterior pituitary growth hormone administered under the same control conditions.

It has also been observed that the extract of the invention has utility in the reversal of nitrogen depletion in mammals caused by treatment with cortical steroids. For example laboratory dogs treated with prednisone as well as the instant extract exhibited at least one fourth the nitrogen depletion of those animals treated with prednisone alone. It is therefore a feature of the invention that the aforesaid product be employed to reduce the nitrogen loss effected by such steroids in those cases where desired.

Although the invention has been illustrated by the aforesaid example for a proper definition of the invention attention must be directed to the appended claims.

I claim:

1. A process for preparing a pituitary growth hormone promoter which comprises precipitating said growth hormone promoter from a weakly acid aqueous extract of mammalian hypothalamic or pituitary tissue, by treatment of said extract with a protein fractionating agent, absorbing the precipitated growth hormone promoter onto a weakly acid cationic exchange resin and subsequently isolating said growth hormone promoter from said cationic exchange resin by elution with an alkaline eluent.

2. The process for isolating a pituitary growth hormone promoter substance from mammalian hypothalamic or pituitary tissue, which comprises the steps:
    (a) contacting said mammalian tissue with a weakly acid aqueous solution to obtain an acidic aqueous extract,
    (b) precipitating said growth hormone promoter substance from the extract of step (a) by contacting said extract with a member of the group consisting of a lower alkanol and ammonium sulfate,
    (c) precipitating said growth hormone promoter substance by contacting a dilute acetic acid solution containing the precipitate obtained from step (b) with an ethyl ether-petroleum ether mixture;
    (d) absorbing said growth hormone promoter substance obtained from step (c) onto a weakly acid cationic exchange medium and thence eluting said growth hormone promoter substance by gradient elution with an alkaline eluent having a pH range of between about 7.1 and 9.5.

3. The process of claim 1 wherein the alkaline eluent is of a pH value of 8.4.

4. The process of claim 2 wherein the alkaline eluent is of a pH value of 8.4.

5. As a composition of matter the product produced by the process of claim 1.

References Cited by the Examiner

Schally: The Biochemical Journal, vol. 70, No. 1, September 1958, pages 97–103.

JULIAN S. LEVITT, *Primary Examiner.*

FRANK CACCIAPAGLIA, JR., *Examiner.*

SAM ROSEN, *Assistant Examiner.*